United States Patent [19]

Inoue

[11] Patent Number: 4,562,391
[45] Date of Patent: Dec. 31, 1985

[54] ROBOTIC POSITIONING SYSTEM

[75] Inventor: Kiyoshi Inoue, Tokyo, Japan

[73] Assignee: Inoue-Japax Research Incorporated, Kanagawa-ken, Japan

[21] Appl. No.: 618,191

[22] Filed: Jun. 7, 1984

[30] Foreign Application Priority Data

Jun. 8, 1983 [JP] Japan .................................. 58-100953
Jun. 17, 1983 [JP] Japan .................................. 58-107729
Aug. 31, 1983 [JP] Japan .................................. 58-157896

[51] Int. Cl.$^4$ ............................................ G05B 19/42
[52] U.S. Cl. .................................. 318/568; 318/640; 318/649; 219/124.1; 901/9
[58] Field of Search ............... 318/568, 648, 649, 640; 901/9, 10, 15, 16, 33, 46; 364/513; 219/124.1, 124.21, 124.31, 124.33, 124.34

[56] References Cited

U.S. PATENT DOCUMENTS

| | | | |
|---|---|---|---|
| 3,212,651 | 10/1965 | Specht et al. | 901/15 |
| 4,052,654 | 10/1977 | Kramer et al. | 318/649 |
| 4,156,835 | 5/1979 | Whitney et al. | 318/648 X |
| 4,221,997 | 9/1980 | Flemming | 318/568 X |
| 4,356,378 | 10/1982 | Cloos et al. | 901/9 |
| 4,412,293 | 10/1983 | Kelley et al. | 901/9 |

FOREIGN PATENT DOCUMENTS

| | | | |
|---|---|---|---|
| 0125110 | 7/1983 | Japan | 318/568 |
| 2102988 | 2/1983 | United Kingdom | 318/568 |

Primary Examiner—B. Dobeck
Attorney, Agent, or Firm—Karl F. Ross; Herbert Dubno

[57] ABSTRACT

A robotic positioning system is provided which comprises a base portion; a plurality of interconnected arm members mounted on the base portion and having respective axes of movement; a hand member carried at a distal end of the arm members for supporting a functional member; a plurality of drive means associated respectively with the plurality of arm members and operable by respective drive signals for moving the arm members along the respective axes so that the functional member reaches a target spacial position and there assumes a target spacial orientation; and a gyro assembly having a frame mounted for joint movement with one of the members and a rotor supported in the frame to rapidly spin about an axis set to orient in a predetermined direction, which is invariable relative to the base portion, whereby to provide a directional reference for monitoring a spacial orientation assumed by the one member upon a movement along the corresponding axis of movement.

6 Claims, 4 Drawing Figures

ROBOTIC POSITIONING SYSTEM

FIELD OF THE INVENTION

The present invention relates to a robotic positioning system and, more particularly, to a new and improved robotic system having a plurality of interconnected arm members which are movable one relative to another for positioning, with a high degree of accuracy, a functional member, particularly a tool electrode in an electrical machining center, which is carried at a distal end of the system.

BACKGROUND OF THE INVENTION

The use of robotic positioning systems becomes increasingly widespread in the industry. In general a robotic system comprises a base portion and a plurality of interconnected arm members mounted thereon. A mechanical hand is carried at a distal end of the arm assembly to grip a functional member such as a welding torch or spray gun. The interconnected arm members are moved by respective actuators or motors under command signals of a control unit so that the functional member may reach a desired spacial position within the limits of these arm movements.

While such conventional robotic systems are fairly satisfactory to meet usual positioning needs, it has been found that they entail serious problems when assembled in a field of use where a high degree of positioning precision is essential. Difficulties especially arise in an electrical machining system or center in which an ultrahigh precision is critical not only as to the three-dimensional position of a reference point but as to a particular direction in which the tool electrode must be oriented or must remain oriented. In rotating each arm in the robotic system, an error is unavoidably created with respect to a target angular position. The error is partly caused by a deformation or deflection of the arm and increases as the arm length increases. Such errors become cumulative through the interconnected arms towards the distal functional end where the mechanical hand carries the tool electrode. An error or deviation of movement of a portion of a member from a movement command can be corrected through a usual sensor and feedback means as has been done in the art. It has been found, however, that such corrections do not correct but may even give rise to an error in the direction in which that member or the eventual functioned member must be oriented.

OBJECTS OF THE INVENTION

Accordingly, the present invention seeks to provides a new, improved robotic positioning system in which an error in the orientation of a movable member is reliably ascertained and corrected so that an ultimate functional member may assume both a position and a posture as accurate as commanded.

The present invention specifically seeks to provide means in a robotic positioning system which provides a reference direction which once set is invariable irrespective of changes in the orientation of a movable member in the system.

SUMMARY OF THE INVENTION

In accordance with the present invention there is provided a robotic positioning system, which comprises: a base portion; a plurality of interconnected arm members mounted on the base portion and having respective axes of movement a hand member carried at a distal end of said arm members for supporting a functional member; a plurality of drive means associated respectively with the said plurality of arm members and operable by respective drive signals for moving the arm members along their respective axes so that the functional member reaches a target spacial position and there assumes a target spacial orientation; and a gyro assembly having a frame mounted for joint movement with one of the said members and a gyro rotor supported in the frame to rapidly spin about an axis set to orient in a predetermined direction, which is invariable relative to the said base portion, whereby to provide a directional reference for monitoring a spacial orientation assumed by the said one member upon a movement along the corresponding axis of movement.

Specifically, the functional member may be a tool electrode in an electrical machining system for electroerosively machining a conductive workpiece and the distal one of said arm members which carries the hand member comprises an axial member positionable in alignment with a preselected direction with respect to a reference surface of the workpiece, the axial member being, upon the arm members reaching their respective target positions, movable axially along the said direction to displace the tool electrode towards and into said workpiece to advance erosive material removal from the latter. The said predetermined direction is preferably parallel to the said preselected direction.

Also, brake means is preferably associated with each of the arm members for locking it against movement in response to a signal indicating its arrival at its target position.

In accordance with a further feature of the invention, the machining system includes a first positioning member for mounting the workpiece fixedly thereon and a second positioning member detachably mounted on the tool electrode to be parallel to the first positioning member, the first positioning means having a plurality of pins projecting therefrom and parallel to each other and to the said preselected direction and the second positioning member having a like plurality of holes arranged to be capable of accepting the pins to confirm that said tool electrode positioned on the robotic system is properly positioned with respect to said workpiece.

Preferably, the robotic positioning system comprises, sensing means responsive to an orientation of said one arm member relative to said set spinning axis to provide a sensory signal and control means responsive to sensory signal for modifying said drive signals therewith so as to enable said one arm member upon reaching its preset target spacial position to assume its target spacial orientation.

BRIEF DESCRIPTION OF THE DRAWING

These and other features of the present invention as well as advantages thereof will become more readily apparent from a reading of the following description when taken with reference to the accompanying drawings in which.

SPECIFIC DESCRIPTION

Figure 1:
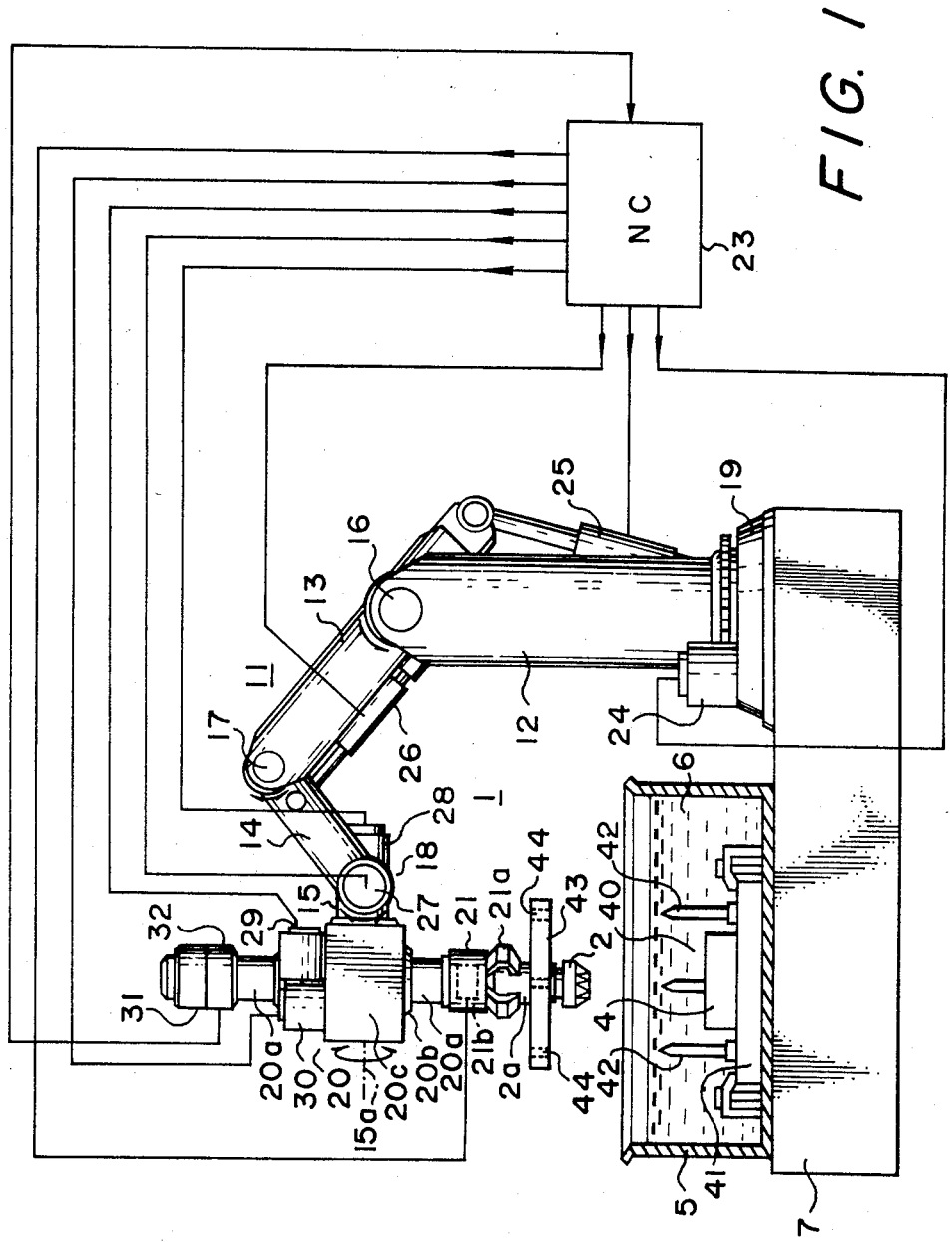
FIG. 1 is an overview diagrammatically illustrating an electrical machining center including a robotic positioning system according to the present invention.
Figure 2:
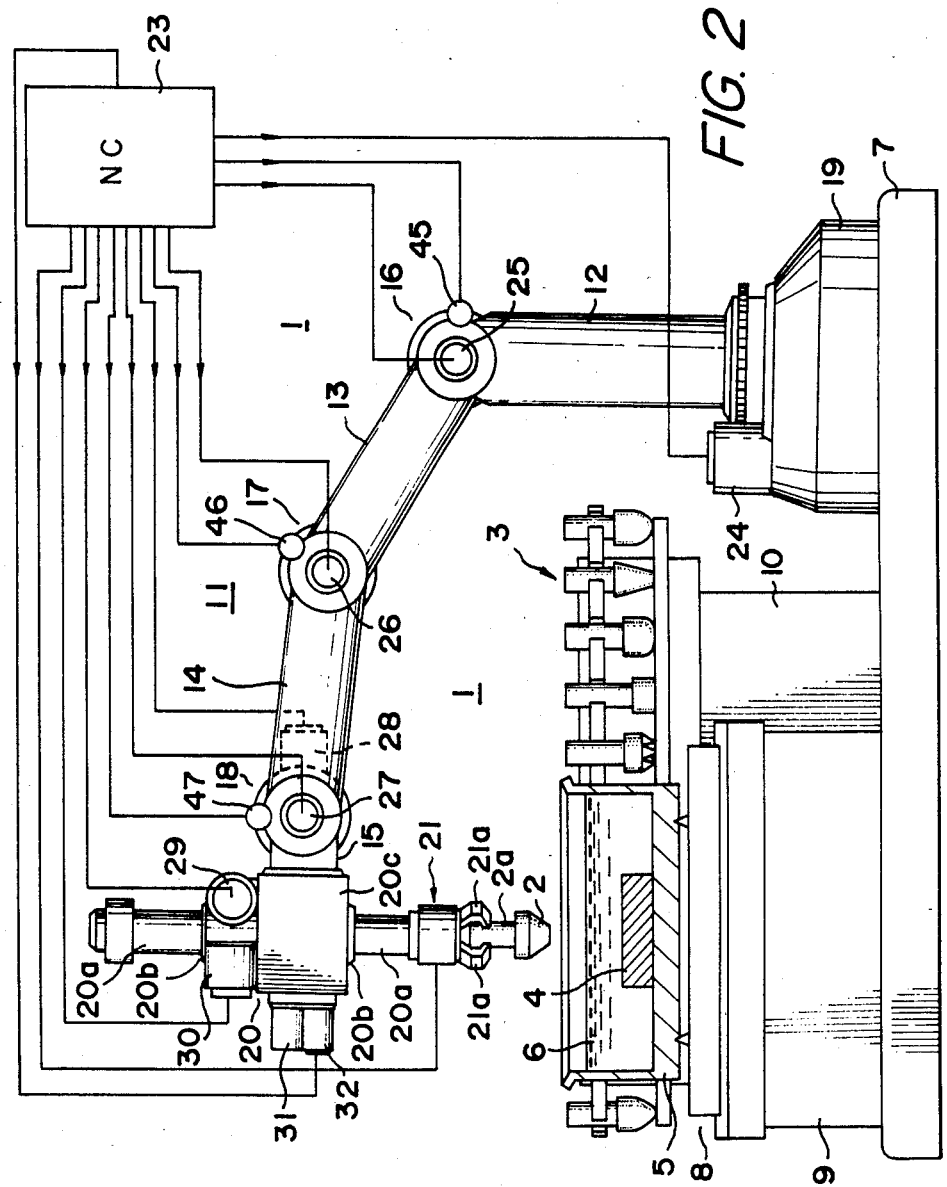
FIG. 2 is a similar view of such a machining center including certain components not shown in FIG. 1 and omitting certain components shown in FIG. 1.

Referring now to FIGS. 1 and 2, there is shown a robotic positioning system 1 assembled in an electrical discharge machining (EDM) center. The robotic system 1 is shown carrying a selected tool electrode 2 which it has transferred from a tool (electrode) storage magazine 3 (FIG. 2) for positioning it accurately with respect to a workpiece 4 in a work zone. The work zone is defined in a worktank 5 supplied with a dielectric liquid 6 and mounted on a base 7. As shown in FIG. 2, the worktank 5 is normally carried by a cross-table 8 movably on a platform 9 which is securely mounted on the base 7. The tool storage magazine is shown as provided on a separate platform 10 mounted in a side-by-side relationship with the platform 9 on the base 8. Although not shown, the machining center further includes an EDM power supply for electrically energizing the tool electrode 2 and the workpiece 4 and an automatic workpiece handing unit for automatically loading and unloading workpieces in the worktank 5.

The robotic positioning system in the illustrated embodiment makes use of an articulated arm assembly 11 including successive arm members 12, 13, 14 and 15 pivotally interconnected at joints 16, 17 and 18. The distal arm member 15 carries a further or extremity arm section 20 which in turn carries a hand section 21 with mechanical fingers 21a grasping the electrode holder 2a. The extremity arm section 20 comprises a shaft 20a having the hand section 21 secured to its one end, the shaft being axially displaceable through a collar 20b which is, rotatably about its axis, mounted in a block 20c, which in turn is mounted on the arm member 15 pivotally about its axis 15a. Thus, the extremity arm section 20 is capable of tilt in a plane (vertical as shown) which is orthogonal to the axis 15a (horizontal as shown), in addition to having an ability to tilt in a vertical plane containing the axis 15a. The hand section 21 has an actuator 21b accommodated therein and operably by command signals furnished from a control unit 23 to actuate the mechanical fingers 20a to hold and release the tool electrode 2 as required.

The first arm member 12 in the form of a vertical stand is, rotatably about its vertical axis, carried on the base section 19 and rotatable by a motor 24 mounted thereon. The second, third and forth arm members 13, 14 and 15 are rotatable in a common plane about the joints 16, 17 and 18 with respect to the first, second and third arm members 12, 13 and 14 by means of motors or actuators 25, 26 and 27, respectively. The motors or actuators 24, 25, 26 and 27 are operable by respective command signals from the control unit 23. The fourth arm member 15, when rotated, tilts the further arm section 20 and hence the hand section 21 about the joint 18 in the vertical plane in which the arm members 13, 14 and 15 are rotated. A further motor 28 is carried on the arm member 15 to operate by a command signal from the control unit 23 to achieve a tilting of block 20c and hence the hand section 21 about the axis 15a. The collar 20b in the extremity arm section 20 carries a motor 29 operable by a command signal from the control unit 23 to axially displace the shaft 20a. The block 20c carries a motor 30 operable by a command signal from the control unit 23 to rotate the collar 20b about its axis with respect to the block 20c.

Thus, through movements of the arms 12-15 and those of the block 20c, the collar 20b and the shaft 20a in the extremity arm section 20, the hand section 21 and hence the tool electrode 2 can, in principle, take any desired spacial position with their inclination and angular position with respect to a surface (e.g. upper) of the workpiece 4. For example, the fourth arm member 15 may be positioned to extend horizontally with its axis 15a spaced from the workpiece surface by a prescribed distance and a center of the block 20c located vertically above a reference point on the workpiece surface. The block 20c may then be positioned to locate the axis of the shaft 20a to lie in alignment with the vertical line on that reference point. The collar 20a may be rotationally positioned to make the shaped surface of the electrode 2 assume a prescribed angular position about that vertical line. Then, the shaft 20a may be axially moved to establish an initial vertical position of the tool electrode 2 for electroerosively machining the workpiece 4. During the EDM operation, the motor 29 is driven to controlledly advance the shaft 20a so that the tool electrode 2 moves downwards following erosive stock removal from the workpiece 4 while maintaining a small gap spacing therewith until a prescribed depth of machining is achieved in the workpiece 4.

Figure 3:
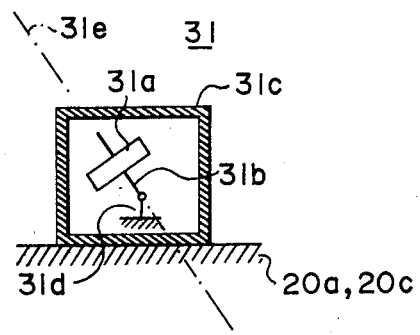
FIG. 3 is a diagrammatic view of a gyro assembly included in the robotic system shown in FIGS. 1 and 2.

In accordance with the present invention, the robotic positioning system 1 further includes a gyroscope assembly 31 which provides a directional reference for monitoring the accuracy of a spacial orientation assumed by any one arm member, hand member or tool electrode upon achieving a predetermined movement. The gyro assembly 31 is shown as mounted on the shaft 20a in FIG. 1 and on the block 20c in FIG. 2. The assembly 1 has a conventional gyro structure comprising a rotor or wheel and axle which are diagrammatically illustrated in FIG. 3 and designated at 31a and 31b, and a frame 31c for accommodating it.

The gyro structure 31a, 31b is supported on a support 31d fixed in relation to the frame 31c, and is, as well known, set in rapid rotation or spinning with its axis 31e in a desired direction. Thus, when the wheel 31a is spinning, it acquires a high degree of rigidity and its axle 31b points in the same direction 31e no matter how the support or base 31d is moved. The frame 31 is securely positioned on a movable member (i.e. the shaft 20a in FIG. 1 and on the block 20c in FIG. 2) for joint movement therewith in the robotic system. Thus, while the frame 31 is moving with the movable member, the axle 31b will remain pointed in a predetermined direction 31e set which is invariable relative to the stationary base section 19 of the robotic system 1.

The gyro frame 31c rotationally moves as a result of the rotational movements of arm members 12, 13, 14, 15 and the block 20c in FIG. 2 and further of the collar 20b in FIG. 1. Since each unit rotational movement may entail an error, such errors may accumulate so that even a greater error may develop from a target spacial orientation of the shaft 20a and the tool electrode 2 as commanded by the drive signals form the control unit 23. Under these circumstances, the gyro assembly 31 provides a highly accurate and reliable directional reference.

For example, where the shaft 20a need be positioned precisely in alignment with a vertical line drawn from a reference point on the upper surface of the workpiece 4 to allow the tool electrode 2 to move towards and into the workpiece precisely along that line, the axle 31b in the gyro assembly 31 can be set to be precisely vertical or in parallel to that vertical line. It is desirable to monitor if the shaft 20a upon movement to reach a target position is really oriented to be truly vertical.

Thus, a sensing unit 32 is associated with the gyro assembly 31 as mounted on the shaft 20b in FIG. 1 and the block 20c in FIG. 2 for sensing an orientation of the shaft 20b or the block 20c with respect to the reference vertical axis 31e established in the gyro assembly 31.

Figure 4:
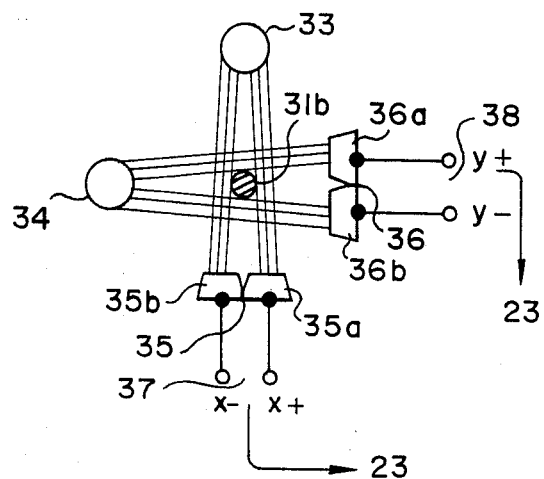
FIG. 4 is a diagrammatic view for the explanation of a typical sensing unit which may be used with the gyro assembly in the illustrated robotic system.

The sensing unit 32 may make use of any conventional principle for optically electrically or magnetically sensing a deflection of an axial body. As shown in FIG. 4, for example, an optical sensing unit 32 may comprises a pair of light sources 33, 34 and a pair of double light sensors 35, 36, all fixed in position with respect to the frame 31a in the gyro assembly 31. These elements 33–36 are arranged for X and Y axes around the axle 31b in such a way that the shadow caused by the axle 31b uniformly covers sensor halves 35a, 35b; 36a, 36b when the orientation of the movable member (20a, 20c) on which the gyro assembly 31 is mounted is in alignment with the set direction 31e. In a deviated position, the asymmetry of the shadow causes a corresponding asymmetry of the light intensity on the two sensor halves 35a, 35b; 36a, 36b. Thus, differential signals which develop at terminals 37 and 38 are representative of respective deviations of orientation along the axes X and Y. These signals are applied to the control unit to modify the drive signals applied to the motors or actuators 24, 25, 27 and/or 28 so that the differential valves are reduce to nil.

In FIG. 1 the electrical machining system is also shown as provided with an electrode-positioning jig unit 40. This unit 40 includes a first positioning plate 41 having the workpiece 4 securely mounted thereon. A plurality of positioning pins 42 projects on the plate 41. A second positioning plate 43 is detachably mounted on the electrode holder 2a and has a plurality of holes 44 bored therein. The pins 42 and the holes 44 are arranged so that when the electrode surface of the tool electrode 2 is properly positioned with respect to the workpiece, the holes 44 are capable of accepting the pins 42. By this jig arrangement, it is thus possible to check if the electrode which has been positioned on the robotic system 1 is properly positioned relative to the workpiece.

In FIG. 2, the articulated arm 11 assembly 11 is also shown as provided with braking units 45, 46 and 47 at joints 16, 17 and 18. Upon ascertaining that all of the movable members in the robotic system have been moved as required to locate the tool electrode 2 at a predetermined positioning prior to initiation of an EDM operation, the control unit 23 provides a signal which actuates the braking units 45, 46 and 47 thereby to lock the arm members 13, 14 and 15 against any movement. By this braking arrangement, while the shaft 20a is set in downward movement, a undesired rotary motion of any of the arm members 13, 14 and 15 which tends to occur due to a change in the center of gravitation of the system is effectively prevented.

What is claimed is:

1. A robotic positioning system, comprising:
    a base portion;
    a plurality of interconnected arm members mounted on the base portion and having respective axes of movement;
    a hand member carried at a distal end of said arm members for supporting a functional member;
    a plurality of drive means associated respectively with said plurality of arm members and operable by respective drive signals for moving said arm members along said respective axes so that said functional member reaches a target spacial position and there assumes a target spacial orientation; and
    a gyro assembly having a frame mounted for joint movement with one of said members and a rotor supported in the frame to rapidly spin about an axis set to orient in a predetermined direction, which is invariable relative to said base portion, whereby to provide a directional reference for monitoring a spacial orientation assumed by said one member upon a movement along the corresponding axis of movement.

2. A robotic positioning system as defined in claim 1 wherein said functional member is a tool electrode in an electrical machining system for electroerosively machining a conductive workpiece and the distal one of said arm members which carries said hand member comprises an axial member positionable in alignment with a preselected direction with respect to a reference surface of the workpiece, said axial member being, upon said arm members reaching their respective target positions, movable axially along said direction to displace said tool electrode towards and into said workpiece to advance erosive material removal from the latter and wherein said predetermined direction is parallel to said preselected direction.

3. A robotic positioning system as defined in claim 2 wherein said preselected direction is vertical to said reference surface of the workpiece.

4. A robotic positioning system as defined in claim 2 or claim 3, further comprising brake means associated with each of said arm members for locking it against movement in response to a signal indicating its arrival at its target position.

5. A robotic positioning system as defined in claim 3 wherein said machining system includes a first positioning member for mounting said workpiece fixedly thereon and a second positioning member detachably mounted on said tool electrode to be parallel to said first positioning member, said first positioning means having a plurality of pins projecting therefrom and parallel to each other and to said preselected direction and said second positioning member having a like plurality of holes arranged to be capable of accepting said pins to confirm that said tool electrode positioned on said robotic system is properly positioned with respect to said workpiece.

6. A robotic positioning system as defined in claim 1, further comprising sensing means responsive to an orientation of said one arm member relative to said set spinning axis to provide a sensory signal and control means responsive to, said sensory signal for modifying said drive signals therewith so as to enable said one arm member upon reaching its preset target spacial position to assume its target spacial orientation.

* * * * *